June 8, 1965   M. J. BINKS   3,188,478
PINHOLE DETECTOR OPTICAL SYSTEM
Filed Jan. 11, 1962
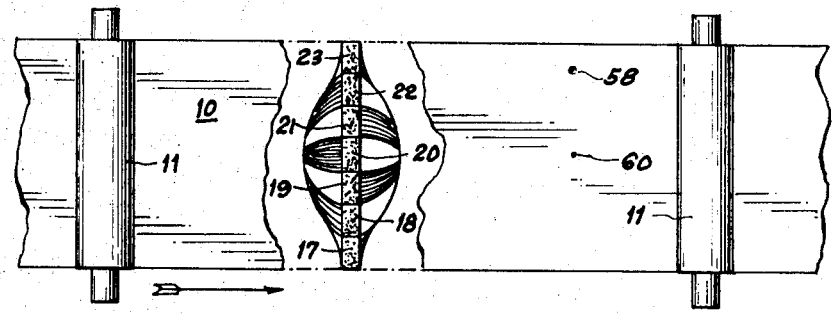
FIG. 2
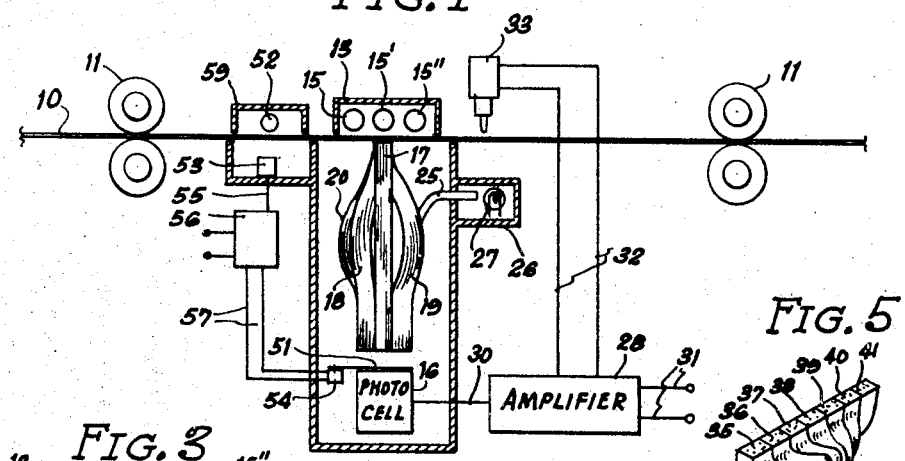
FIG. 1
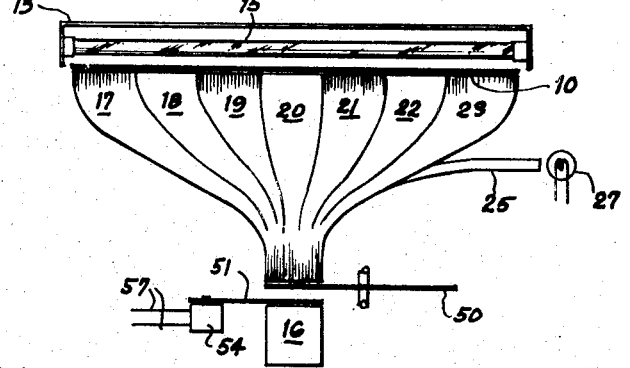
FIG. 3
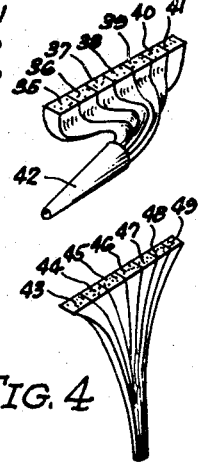
FIG. 5
FIG. 4
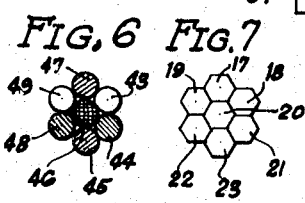
FIG. 6   FIG. 7   FIG. 8
INVENTOR.
Melvin J. Binks
BY Horton, Davis,
Brewer & Brugman
Attys

United States Patent Office 3,188,478
Patented June 8, 1965

3,188,478
PINHOLE DETECTOR OPTICAL SYSTEM
Melvin J. Binks, 4880 N. Marine, Chicago, Ill.
Filed Jan. 11, 1962, Ser. No. 165,579
8 Claims. (Cl. 250—219)

This invention relates to a device for detecting pinholes or other discontinuities in sheet materials.

Particularly in the manufacture of tin plate for use in producing tin cans, it is necessary to locate discontinuities in sheet material which would cause leakage and corrosion in the finished cans. Small occlusions of slag in steel are crushed when the steel is rolled to very thin gauge, and the fragments of the crushed slag fall out of the plate leaving what are known as "pinholes." These discontinuities are holes that are too small to be found conveniently by visual inspection. In high speed mills, even substantially larger discontinuities, such as tears, cannot be readily visually located.

Tin plating of sheet steel is accomplished electrolytically, and as a result no tin is plated over areas where pinholes exist. Canned food therefore can leak from the container. Plates with large pinholes can be used to make containers for powders, and very small pinholes can be tolerated without adverse effects even to contain liquids. Therefore, an adequate pinhole detector must both locate pinholes in the sheet material, and distinguish their size. For example, in canning certain foods, it would require distinguishing holes larger than 0.001 inch in diameter from those that are smaller, the maximum hole size for each use depending on the characteristics of the material to be held.

Most pinhole detectors depend upon sensing a ray of light shining through a discontinuity as a means of detecting its presence. Pinhole detectors generally provide a path for sheet material to pass through them, and that path will have a light source placed on one side of it and photosensitive means on the other. As the sheet material, in the form of a continuous ribbon or strip, passes through the detector, light shining from the source through a discontinuity will actuate the photosensitive elements which in turn cause a response in the form of a visual or audible signal or a system for marking or classifying the portion of the strip where a hole exists. Tin plate generally is in continuous strips when inspected, and it is necessary to place a light source on one side of the plate and a battery of photosensitive elements on the other side to inspect the entire width. Since the strip passes through the detector at high speed and the discontinuities are frequently extremely small, the light exposure available to operate the photosensitive elements is small and consequently, the photosensitive elements must be very sensitive to light. The detectors also must be well shielded in order to prevent stray light from actuating them.

One of the major problems with existing pinhole detectors is the maintenance of their quantitative response. To be quantitative, that is to be capable of discriminating a large hole from a small one, the photosensitive elements or detectors must be selected to yield not only a predetermined response to light, but also a matched response so that each photosensitive element in the battery responds the same way to light of any given intensity. Test lights to check the responsiveness of many detectors actuate all photocells simultaneously so that the responsiveness of each individual photocell cannot be checked without dismantling the machine. Devices to check each cell individually require a great deal of extra equipment to isolate each cell from the test light of the others. Also the electrical "noise" produced by the battery of cells is cumulative and provides a high noise level to which response to light must be added.

Since the basis of the quantitative response is light intensity, it is extremely important that the intensity of the light passing through the pinhole is the same or proportional to the intensity of the light that strikes the photosensitive element. A pinhole may not have its axis normal to the plane of the plate, and light passing through a sufficiently small pinhole having an axis at, for example 45°, to the plane of the plate surface, must be reflected from a side wall of the detector assembly before it can strike a photosensitive element. Light passing through such a pinhole traverses a longer path than a ray that strikes the photosensitive element directly, and in addition to traversing a longer path, some energy is lost in absorption by the reflecting surface. In other words, a ray that passes through a pinhole and strikes the photosensitive element directly can cause a greater response than a ray of the same intensity which must traverse a longer path and have part of its energy absorbed in reflection before it strikes the photosensitive element.

It is an object of this invention to provide a pinhole detector that may be used to inspect sheet material of any size employing only one, or at most a very few independently operating photosensitive elements which give uniform response for any given light intensity and which inherently operate at a low noise level.

It is another object of this invention to provide a pinhole detector having a light path between the pinhole and a photosensitive element which light path has equal resistance to the passage of light regardless of what part of the sheet material the light passes through and regardless of the angle at which it passes through the sheet.

It is another object of this invention to provide a pinhole detector that operates at a low noise level thereby maintaining accurate quantitative responsiveness.

These and other objects are accomplished by the pinhole detector of this invention which comprises generally a path to be traversed by the sheet material to be inspected having on one side a light source and on the other side a light detecting means. The light detecting means consists of a suitable photosensitive element that is responsive to light of a predetermined intensity and one or a group of bundles of light-conducting glass fibers.

Light-conducting glass fibers, such as those descirbed on page 72, volume 203, No. 5 of the periodical Scientific American are thin fibers of glass coated with glass of a different refractivity and bonded together with their longitudinal axes parallel. These fibers, singly or in bundles, have the property of almost total internal reflection of light. Light entering the end of a fiber is conducted through the length of the fiber, even around bends, and discharges from the other end of the fiber. The losses in intensity of the light due to absorption are uniform, predetermined and independent of the angle that the light enters the fiber. The sensing means employed in this invention includes one or a series of such bundles on the side of the sheet material opposite the light source. The bundles of fibers are disposed with the fiber ends closely adjacent the sheet material and extending transversely at least across the entire path of the sheet material in a scanning relationship to the sheet. Preferably, the bundles extend beyond each end of the width of the sheet material a slight amount. The bundles are maintained in a chamber that is shielded from extraneous light sources so that the only light that can enter the chamber is light emanating from the source and passing through a discontinuity in the sheet. Light is prevented from entering the chamber at the ends of the path for strip material by light shields which extend over the edges of the strip in conventional manner. The other ends of the glass fiber bundles are accumulated into a compact area and directed to be normal to a photosensitive element.

One embodiment of this invention includes creating equivalent optical paths or optical paths that provide equal intensity losses or light absorption between the pinhole and the photosensitive element regardless of the position or angle of the pinhole. The creation of equivalent optical paths can be accomplished in several ways. One method is to make all of the fiber bundles exactly the same length. Bundles conducting light from the edges of the sheet path will, in this embodiment, extend directly from one of their flat end faces to the other, while bundles sensing from the center of the path will follow a more tortuous route between their end faces. Equivalent optical length may also be obtained by employing filters on the ends of shorter bundles to absorb the amount of light energy equivalent to the absorption of the extra length of the longest bundles.

Light passing through a pinhole and impinging on the photosensitive element creates an electrical response from the photosensitive element. This response is amplified, after which it actuates means for signaling the presence of, counting, marking, or otherwise locating the pinhole. The means responsive to the photosensitive element may operate flaps or baffles to sort subsequently cut individual sheets with pinholes from sheets that have no discontinuities. Employing the output of the photosensitive element to operate other sorting or identifying means is a modification considered within the scope of this invention.

The light source employed preferably is one or more lamps that are operated with either D.C. or A.C. at high frequency. In modern mills, the sheet material passes through a pinhole detector at an extremely high speed and the exposure time in the detector is very brief. For example, at 60 cycles per second A.C. and with the strip passing through the detector at 3000 feet per minute, five inches of strip will pass through the detector per half cycle, or per pulse, and pinholes that are two inches apart might not be individually detected. However, when the lamp is operated with a high frequency, for example 10,000 cycles per second, there will be 33 pulses per inch at that strip speed. The frequency of the light can easily be selected for the particular strip speed and sensitivity required in each case, and for most cases many pulses per inch of strip should be provided. When a continuous D.C. light source is employed, a D.C. amplifier may be employed. However, when a D.C. source is used, it is preferred to employ a high frequency chopper in either the optical or electrical circuit to create a square wave signal. This expedient is preferred because an A.C. amplifier can then be used which is advantageous because of the inherently greater range that A.C. amplifiers have as compared with D.C. amplifiers. A chopper in the optical circuit may consist of a perforated or slotted disc rotating at high speed between the discharge end of the fiber bundles and the photosensitive element. A chopper in the electrical circuit, such as a multivibrator, may also be used between the photosensitive element and the amplifier.

The accompanying drawings illustrate a presently preferred embodiment of this invention.

FIG. 1 shows a partly sectional, partly schematic elevation view of a pinhole detector embodying this invention;

FIG. 2 shows a partly cut-away plan view of the detector shown in FIG. 1;

FIG. 3 is an enlarged view from the right side of portions of the pinhole detector shown in FIG. 1;

FIG. 4 illustrates one suitable arrangement of fibre bundles wherein each bundle is drawn and tapered;

FIG. 5 shows another suitable arrangement of fiber bundles wherein all bundles are the same length, are arranged to direct the light approximately 90° from the incident rays and terminate in a single light conductor; and FIGS. 6, 7 and 8 are cross-sections of appropriate bundle endings accumulated compactly to discharge light into a photosensitive element, and these figures are not intended to be to scale or to represent sizes relative to each other.

Referring to the drawings, a continuous piece of sheet material 10 is passed through the device by the operation of rollers 11 which drive the sheet material in the direction of from left to right as depicted in the drawings. A path for the sheet material is defined between a chamber 12, which is opaque and arranged to exclude any extraneous light, and light sources 15, 15' and 15" which are maintained in a chamber 13. Conventional light shields employed around the edge of the sheet, which are not shown, will be employed to maintain chamber 12 sealed from extraneous light.

The detection assembly is placed within the opaque chamber 12. The detection assembly includes a photosensitive element 16 and one or a plurality of fiber bundles, shown here as seven bundles numbered 17–23. An additional bundle 25 passes through the wall of chamber 12 into a second lightproof chamber 26 which contains a test lamp 27 that is used intermittently to test both the quantitative and qualitative response of photosensitive element 16. Photosensitive element 16 is connected through the wall of chamber 12 to A.C. amplifier 28 by means of a conductor 30. The A.C. amplifier 28 is connected to a source through conductors 31 and is employed in the usual way to convert the signal from the photosensitive element to a substantially larger but proportional signal that is carried by conductors 32 to a device shown here as a marker 33, which could also be a classifier or other means for sorting or identifying portions of the sheet material 10.

The glass fiber bundles, as heretofore stated, consist of bundles of parallel glass fibers that are bonded to and surrounded by a glass having a different index of refraction. These bundles are composed of fibers that are so small in diameter that they may be bent around corners and may even be flexible in bundles. The characterizing feature of these bundles is that the light entering the end of each fiber is transmitted through the fiber with substantially complete internal reflection whereby it discharges from the other end without losses through the fiber wall. Intensity losses due to absorption are experienced in passing through the fiber, but these are uniform, predictable and predetermined per unit of fiber length.

Other materials that are capable of providing this function to a greater or lesser degree may be employed within the scope of this invention. Such material as rods or tubes of poly methyl methacrilate, known commercially as Lucite or Plexiglas, optical glass with polished or silvered exterior surfaces and similar materials may be employed; however these materials must be used cautiously to insure that their optical properties are not exceeded. For example, lateral transmission of light, particularly at bends or where the cross section is diminished, can produce losses that will seriously affect the quantitative response of the detector over certain portions of the strip path.

The invention contemplates employing fiber bundles of the same absolute length so that light from a pinhole at any portion of the width of the sheet material 10 will pass through the same length of fiber in being transmitted from the pinhole to the photosensitive element. The fiber bundles shown in FIGS. 1, 2, 3 and 5 illustrate several variations of such equal optical length. It may be noted that bundles 17 and 23 must pass laterally from the edge of plate 10 to a position immediately above photosensitive element 16 and in so doing must traverse a greater distance than the bundle 20 which is positioned directly above photosensitive element 16. This additional length of travel is compensated for by causing bundle 20 to bulge longitudinally with respect to sheet material 10 in exactly the amount that bundles 17 and 23 must bulge laterally. In other words, the length of each bundle between the end face adjacent sheet material 10 and the end face adjacent photosensitive element 16 is the same.

In FIG. 5 bundles identified with numerals 35 through 41 consecutively illustrate a modification of this invention wherein the fiber bundles which are all of the same length traverse paths with greater or lesser degrees of directness so that they all travel the same distance between the planes in which their opposite end faces lie. The bundles of FIG. 5 also illustrate another advantage of this invention in that the bundles are all bent through a 90° turn so that the photosensitive element may be mounted horizontally whereby it is convenient to install and adjust and it requires much less vertical space.

Also in this embodiment, a large diameter single filament fiber 42 that has been drawn to a conical shape is optically connected to the end faces of one side of the bundles 35–41 so that light entering the wide end of filament 42 is concentrated to discharge through a substantially smaller area from the narrow end. This means of concentrating the light permits a rather wide end face on the fiber bundles to actuate a relatively small photosensitive element, such as an ordinary photoelectric cell or photovoltaic p–n junction cell. Optical systems for concentrating light may also include lenses, a conical tube with silvered interior, a conical bar with silvered exterior, a light gathering sphere which is a hollow sphere placed over the ends of the fiber bundles and having its interior coated with light reflecting material. A photosensitive element preferably at 90° from the axis of the bundles, opens within the sphere. Other concentrating means and various combinations of the above may also be used.

FIG. 4 illustrates an embodiment wherein the cross-section of each fiber bundle 43–49, inclusive, is reduced by such means as heating the bundle after it is formed and drawing it to a lesser diameter. The discharge end of such a group of bundles is concentrated into a small compact area which would appear as in FIG. 6. In the embodiment illustrated in FIG. 4, the bundles are of different lengths, bundles 43 and 49 being the longest, bundles 44 and 48 being next longest, bundles 45 and 47 being next to the shortest and bundle 46 being the shortest. In such a group of bundles, the longer bundles will absorb more light than the shortest one which will affect the quantitative response of the photosensitive element to light from the various bundles. To overcome this difficulty and retain equivalent optical characteristics, filters of different absorptivity may be placed over the ends of some bundles. As illustrated in FIG. 6, identical filters may be placed over the ends of bundles 44 and 48 to absorb the amount of light discharging from those bundles that is equivalent to the absorption due to the extra length of bundles 43 and 49. Filters of even greater density may be placed over the ends of bundles 47 and 45 to absorb light equivalent to the extra length of bundles 49 and 43 and an even denser filter may be placed over the end of bundle 46, which is the shortest bundle to absorb light equivalent to the extra length of bundles 49 and 43. Bundles 49 and 43 require no filters and are shown without them. Thus it is that all of the bundles will comprise light conducting paths of equal light transmissivity.

The light bundles may terminate in hexagonal cross-sections as shown in FIG. 7 or in some pattern of square cross-sections as shown in FIG. 8, and one bundle ending may be for the test light bundle 25, although it may be tapped into one of the other bundles to preserve a compact cross-section at the discharge end.

In FIG. 3 parts of the optical path are shown in greater detail. These include a mechanical chopper 50 in the form of a perforated or slotted disk that rotates on a shaft, which is employed when the light sources function on D.C. energy and an A.C. amplifier is used. The chopper 50 creates a high frequency square wave voltage in photosensitive element 16 and amplifier 28 receives that output as an A.C. voltage which is amplified to a proportionately larger A.C. voltage in lines 32.

FIG. 3 also shows a light stop or shutter 51 which is placed to prevent light from the fiber bundles from entering photosensitive element 16. The light stop or shutter is employed when no sheet material 10 is between the light sources and chamber 12. When the sheet runs out, photosensitive element 16 is exposed to relatively intense light for a relatively long period. Such exposure causes a sensitive cell to become highly emissive and to operate with a high noise level for several hours. As heretofore explained, the response of a photosensitive element is added to the noise level, and a high noise level will change the quantitative response of such a photosensitive element. It is therefore very desirable to avoid a high noise level.

Shutter 51 may be actuated by an additional light source 52 that is positioned within a chamber 59 to actuate a photosensitive element 53 which is much less responsive to light than photosensitive element 16. The sensitivity of element 53 is such that the small amount of light shining through an ordinary discontinuity will not actuate it. Only direct exposure as when no sheet material is between the source and the sensitive element will cause a response. The photosensitive element is connected with conductor 55 to an amplifier 56 which operates through conductors 57 to energize the means 54 which in turn causes shutter 51 to operate.

The pinhole detector of this invention functions as follows. Rollers 11 drive sheet material from left to right through the pinhole detector. As the ribbon passes through the detector, it comes between light sources 15, 15' and 15", and photocell 16. Immediately below the sheet material 10 are disposed the end faces of a series of glass fiber bundles which end faces extend transversely at least across the entire width of the sheet material. The fibre bundles 17–23 and the photosensitive element 16 are enclosed in a chamber 12 to be in total darkness. When a pinhole passes between the sources and the end faces of bundles 17–23, the light passing through the pinhole enters the end face of one of the fiber bundles and is conducted through the bundle to discharge into photosensitive element 16. If the pinhole is big enough, the intensity of the light passing through it will be sufficient to actuate the photosensitive element 16, as by discharging a photoelectric cell, which results in an output passing through conductor 30 that is amplified to sufficient magnitude to actuate locater 33. Locater 33 is timed and positioned to place a locating mark such as a dent or scratch on the sheet material 10, as shown at 58 in FIG. 1, at the portion of the sheet that was directly below lamp 15' at the time that the photocell was actuated, thereby locating pinhole 60.

From the foregoing description, it is evident that the pinhole detector of this invention is capable of highly accurate response of both qualitative and quantitative nature. The use of a single photosensitive element, or at most a very few which operate independently with different bundles, reduces the electrical noise many-fold, it makes periodic testing of the accuracy of the response more easily and accurately accomplished and it produces significant savings both in the construction and maintenance of the device.

A single photosensitive element may be used because of the fiber bundle light transmitters in the detection assembly. The bundles, besides permitting the use of a single photosensitive element, conduct light from a pinhole to the photosensitive element with predetermined and equal intensity losses that can be accounted for in designing quantitative responsiveness.

Having thus described the invention, what I claim is:

1. In a pinhole detector for detecting holes in a rapidly moving continuous sheet of material having two major surfaces, the means including a light source, a photosensitive element, means actuated by said photosensitive element for indicating the presence of a hole in said sheet of material, means defining a path between said light source and said photosensitive element for said rapidly moving continuous sheet of material, said light source being disposed adjacent to and across said path for directing light against one major surface of said sheet of material, and means shielding said photosensitive element from extraneous light; the means comprising a plurality of separate elongated light conductors each having a first end and a second end, said first end including an end face disposed adjacent to and in scanning relationship to the other major surface of said sheet of material, said first ends of said plurality of light conductors being in side-by-side relationship and said end faces thereof being aligned with and confronting said light source whereby light from said light source impinges upon at least one of said end faces when a hole in said sheet of material passes said light source, each of the second ends of said plurality of light conductors having an end face disposed to discharge conducted light into said photosensitive element.

2. The detector of claim 1 in which each of said plurality of light conductors comprises a bundle of light conducting fibers.

3. The detector of claim 1 in which each of said plurality of light conductors defines a light path of substantially equal light transmissivity.

4. The detector of claim 3 in which a filter that absorbs light is disposed over an end face of a first of said plurality of light conductors to create a light path of light transmissivity equivalent to the light transmissivity of a second of said plurality of light conductors.

5. The detector of claim 2 in which each of said plurality of light conducting bundles is tapered with the end face thereof in scanning relationship having a larger area than the end face thereof disposed to discharge light into said photosensitive element.

6. The detector of claim 1 in which light responsive shutter means intercepts light between said light conductors and said photosensitive element when no sheet material is in said detector.

7. The detector of claim 1 in which said light source includes a D.C. lamp and chopper means is interposed between said light conductors and said photosensitive element.

8. In a pinhole detector for detecting holes in a rapidly moving continuous sheet of material having two major surfaces including a light source, a photosensitive element, means actuated by said photosensitive element for indicating the presence of a hole in said sheet of material, means defining a path between said light source and said photosensitive element for said rapidly moving continuous sheet of material, said light source being disposed adjacent to and across said path for directing light against one major surface of said sheet of material, and means shielding said photosensitive element from extraneous light; the means comprising a plurality of separate elongated light conductors each having a first and a second end, said first end including an end face disposed adjacent to and in scanning relationship to the other major surface of said sheet of material, said first ends of said plurality of light conductors being in side-by-side relationship and said end faces thereof being aligned with and confronting said light source whereby light from said light source impinges upon at least one of said end faces when a hole in said sheet of material passes said light source, each of said second ends of said plurality of elongated light conductors having a second end face, each of said second end faces discharging conducted light into said photosensitive element of a generally uniform intensity in response to a uniform light input at each of said first end faces.

References Cited by the Examiner
UNITED STATES PATENTS

| | | | |
|---|---|---|---|
| 2,256,595 | 9/41 | Metcalf | 250—227 |
| 2,410,104 | 10/46 | Rainey | 250—227 |
| 2,563,274 | 8/51 | Rendel | 88—14 |
| 2,606,294 | 8/52 | Hagan | 250—219 |
| 2,669,354 | 2/54 | Perrin | 250—227 X |
| 2,892,951 | 6/59 | Linderman | 250—220 |
| 2,945,958 | 7/60 | Morris | 250—230 |
| 2,981,845 | 4/61 | Larew et al. | 250—219 |
| 3,114,283 | 12/63 | Gruner | 250—227 X |

RALPH G. NILSON, *Primary Examiner.*

ARCHIE R. BORCHELT, *Examiner.*